US007516821B2

(12) United States Patent
Powers

(10) Patent No.: US 7,516,821 B2
(45) Date of Patent: *Apr. 14, 2009

(54) BRAKE SYSTEM AND SUSPENSION FOR USE THEREWITH

(75) Inventor: Michael K. Powers, Clinton, OH (US)

(73) Assignee: Suspension Technology, Inc., Canton, OH (US)

( * ) Notice: Subject to any disclaimer, the term of this patent is extended or adjusted under 35 U.S.C. 154(b) by 73 days.

This patent is subject to a terminal disclaimer.

(21) Appl. No.: 11/471,055

(22) Filed: Jun. 19, 2006

(65) Prior Publication Data

US 2006/0237266 A1    Oct. 26, 2006

Related U.S. Application Data

(63) Continuation of application No. 10/927,690, filed on Aug. 27, 2004, now Pat. No. 7,137,487.

(51) Int. Cl.
*B60T 1/06* (2006.01)
*B60G 3/00* (2006.01)
(52) U.S. Cl. ............. 188/18 A; 188/218 R; 301/6.8
(58) Field of Classification Search ............. 188/18 A, 188/218 R, 218 XL; 280/124.125, 124.126; 301/6.1, 6.8
See application file for complete search history.

(56) References Cited

U.S. PATENT DOCUMENTS

| 3,042,452 | A |   | 7/1962  | Bly et al.      |
|-----------|---|---|---------|-----------------|
| 3,758,129 | A |   | 9/1973  | Ishikawa et al. |
| 3,963,260 | A |   | 6/1976  | Inbody          |
| 4,082,363 | A | * | 4/1978  | Goodbary ............ 301/6.3 |
| 4,234,236 | A |   | 11/1980 | Inbody          |
| 6,398,251 | B1|   | 6/2002  | Smith           |
| 6,594,980 | B2|   | 7/2003  | Oka et al.      |
| 2001/0019000 | A1 | | 9/2001 | Matsuoka et al. |

* cited by examiner

*Primary Examiner*—Melody M Burch
(74) *Attorney, Agent, or Firm*—Sand & Sebolt

(57) ABSTRACT

A compact brake system for a wheeled vehicle fits substantially within the profile of a tire and rim to reduce wheel box width to increase cargo space between wheel boxes. In one embodiment, a caliper bracket is mounted on a spindle lever connected to a wheel spindle, eliminating the need for a standard brake flange extending from the spindle and thereby reducing the width of the brake system. The spindle lever is mounted on a torque bar rotatably mounted on an axle to allow vertical movement of the spindle to be reacted in a dampening mechanism. A brake caliper is mounted on the caliper bracket for brakingly engaging a brake rotor. The brake caliper, caliper bracket, spindle lever and spindle are substantially or entirely disposed within the tire profile. Alternately, the brake caliper may be mounted on a drop center spindle or used with a spindle mounted on an axle.

19 Claims, 14 Drawing Sheets

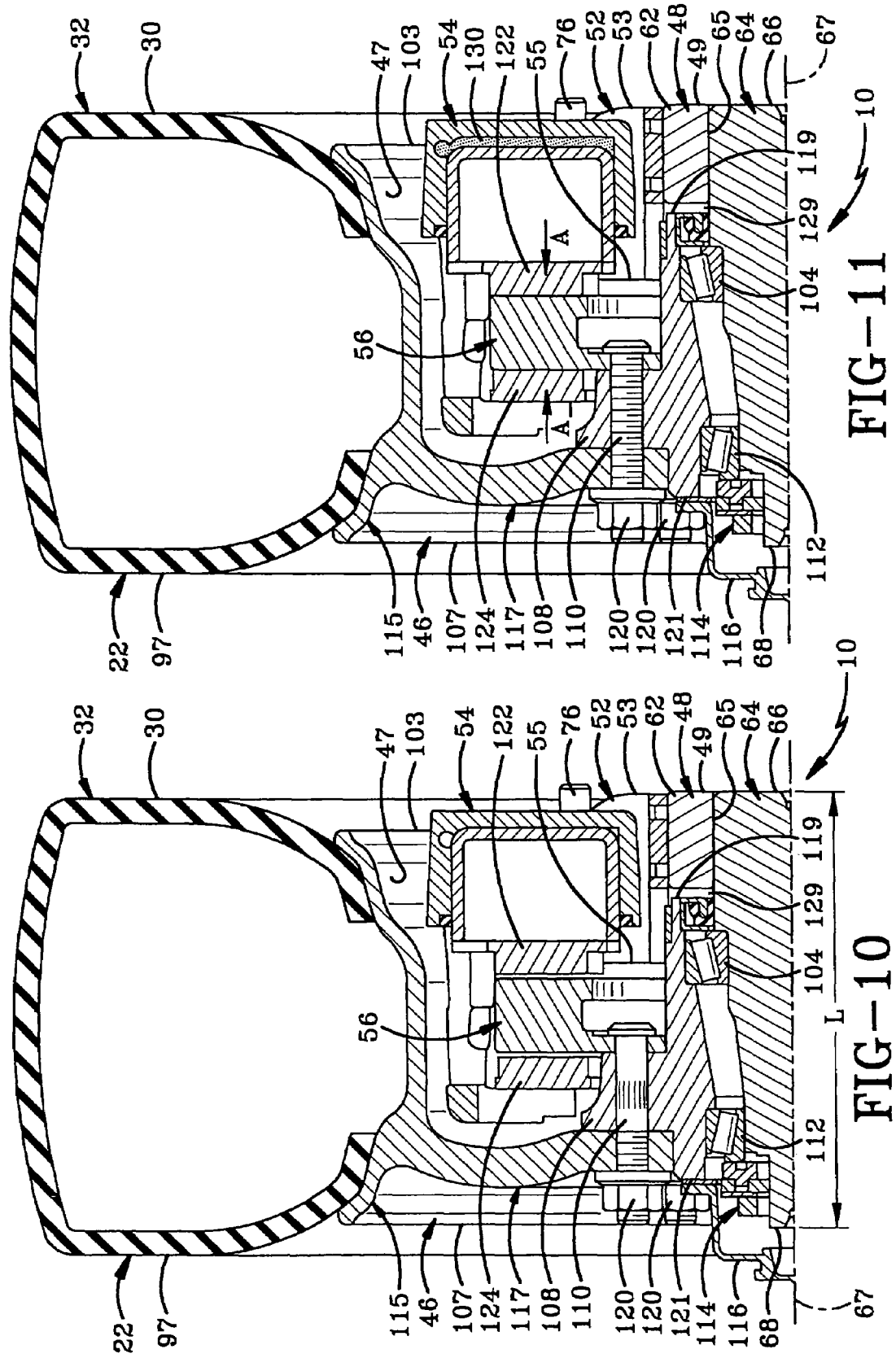

BRAKE SYSTEM AND SUSPENSION FOR USE THEREWITH

CROSS REFERENCE TO RELATED APPLICATION

This application is a continuation of U.S. patent application Ser. No. 10/927,690, filed Aug. 27, 2004; the disclosure of which is incorporated herein by reference.

BACKGROUND OF THE INVENTION

1. Technical Field

The invention relates generally to a brake system for use with wheeled vehicles or trailers. More particularly, the invention relates to such a brake system which fits substantially within the rim of a wheel to enlarge cargo space by reducing the size of the wheel box of the vehicle or trailer. Specifically, the invention relates to such a brake system which fits substantially within the profile of the vehicle wheels.

2. Background Information

In the transportation of cargo via tractor-trailer rigs and other trucks and vehicles, cargo space is at a premium. Typically this cargo space is within a trailer being hauled by a truck or tractor rig. One factor that reduces the available cargo space within a trailer is the existence of inwardly extending wheel boxes or fenders which house the upper portion of the wheels of the trailer or other vehicle. Because there are legal width standards which a cargo trailer may not exceed for travel on public roads, it is impractical to eliminate these wheel boxes. These wheel boxes take up a substantial amount of space within the cargo area and as a result it is desirable in the art to reduce the size of the wheel boxes to provide additional cargo space.

One solution to this problem is disclosed in U.S. Pat. No. 6,398,251 granted to Smith, which discloses an axleless vehicle suspension system. In addition to allowing a widened cargo area, the Smith patent also allows the trailer body to be lowered closer to the ground to increase cargo space in that dimension. However, the structure of the Smith invention eliminates the vehicle axle and requires other substantial changes to conventional structures and thus is likely to be a relatively costly solution. There remains room for improvement for increasing cargo space by reducing the size of wheel boxes and Applicant's invention adds a significant step in this direction.

BRIEF SUMMARY OF THE INVENTION

The present invention includes a brake system for a vehicle having a frame, the system comprising a spindle assembly including a spindle member and an arm extending transversely therefrom; the spindle member having an axis; a rim rotatably mounted on the spindle member about the axis; a tire mounted on the rim; the tire having a substantially circular inner edge; the spindle extending radially outwardly from the axis no further than does the inner edge of the tire; a brake caliper mounted on the spindle and being disposed at least partially outboard of the inner edge of the tire.

The present invention also includes a brake system for a vehicle having a frame, the system comprising a spindle having an axis; a rim rotatably mounted on the spindle about the axis; a tire mounted on the rim; the tire having a substantially circular inner edge; a brake rotor rotatably mounted on the spindle about the axis and disposed entirely outboard of the inner edge of the tire; and a brake caliper for selectively brakingly engaging the rotor; the brake caliper being disposed entirely outboard of the inner edge of the tire.

The present invention further includes a brake system for a vehicle having first and second opposed sides, the system comprising a spindle having an axis and being adapted to mount on an axle adjacent one of first and second opposed ends of the axle, the axle extending between the first and second sides of the vehicle with the first end of the axle adjacent the first side of the vehicle and the second end of the axle adjacent the second side of the vehicle; a rim rotatably mounted on the spindle about the axis; a tire mounted on the rim and having an inner edge; and a brake caliper mounted on the spindle and being disposed at least partially outboard of the inner edge.

The present invention also includes a brake system for a vehicle having a frame, the system comprising a spindle having an axis; a hub rotatably mounted on the spindle about the axis; the hub having an inner edge and an outer edge; a brake rotor mounted on the hub entirely between the inner and outer edges of the hub; and a brake caliper mounted on the spindle for selectively brakingly engaging the rotor.

BRIEF DESCRIPTION OF THE SEVERAL VIEWS OF THE DRAWINGS

FIG. 8 is a diagrammatic view showing the relationship between FIGS. 8A and 8B.

FIG. 10 is an enlarged fragmentary view of the upper portion of FIG. 9 showing the brake system in a non-braking position.

FIG. 11 is similar to FIG. 10 and shows the brake system in a braking position.

Similar numbers refer to similar parts throughout the specification.

DETAILED DESCRIPTION OF THE INVENTION

Figure 1:
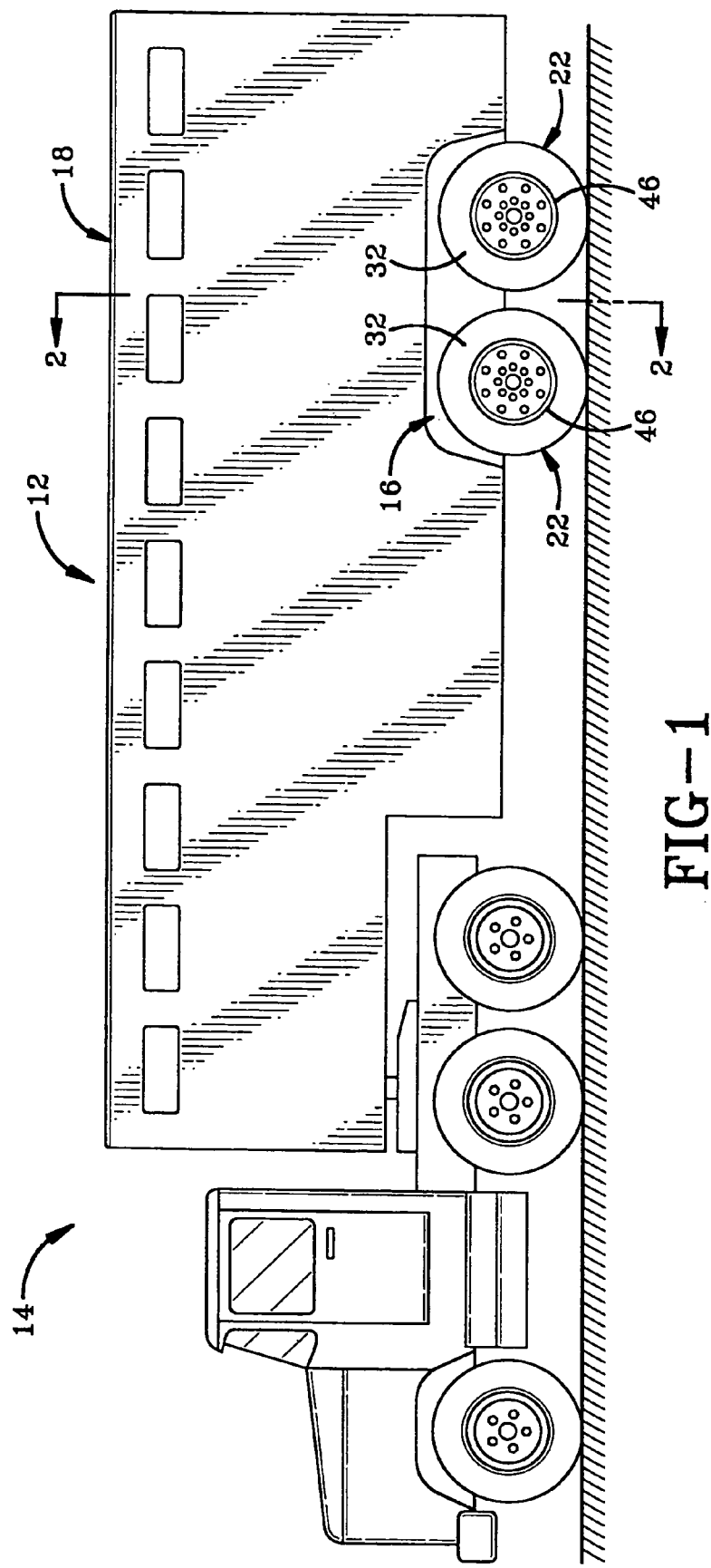
FIG. 1 is side elevational view of a tractor-trailer rig with which the brake system of the present invention is used with the trailer.
Figure 2:
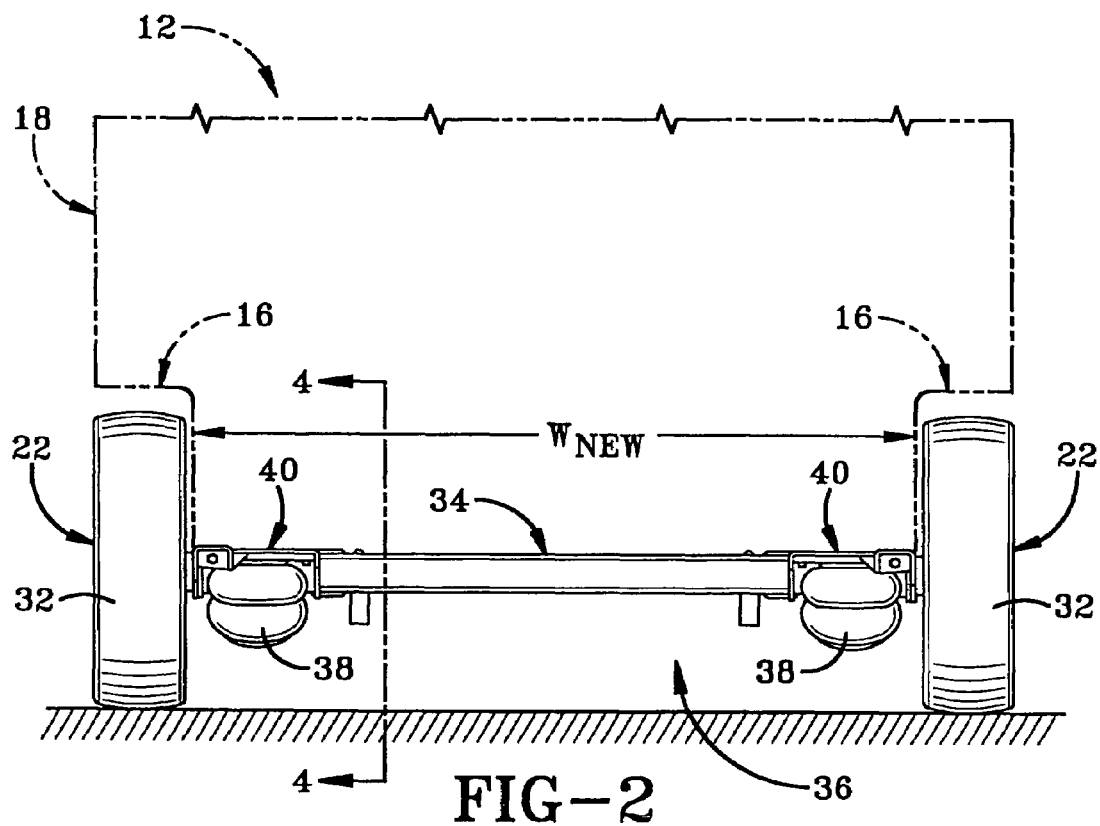
FIG. 2 is sectional view of FIG. 1 taken on line 2-2 with the trailer body shown in phantom.
Figure 3:
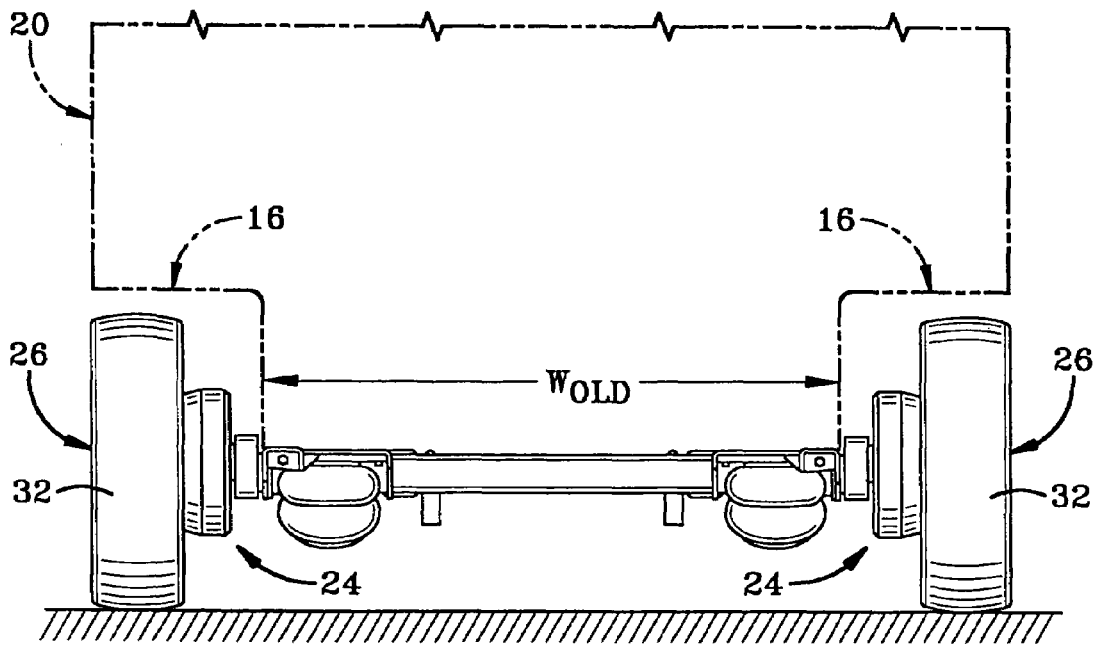
FIG. 3 is similar to FIG. 2 except it is a fragmentary view and shows a prior art brake system and corresponding trailer body shown in phantom.

The brake system of the present invention is indicated generally at 10 in FIGS. 4-6 and 8-9. System 10 is configured to be used with a wheeled vehicle such as a trailer 12 of a tractor-trailer rig 14 (FIG. 1). System 10 is more particularly configured for use with a wheeled vehicle having a cargo area into which fenders or wheel boxes (as at 16 in FIG. 2) extend, and is intended to increase the cargo area by reducing the size of the wheel boxes. This increase in cargo space and reduction of wheel box width is indicated in FIG. 2 in contrast to the prior art shown in FIG. 3. More particularly, system 10 allows wheel boxes 16 of a trailer body 18 to have a reduced width, thereby allowing the cargo space between wheel boxes 16, as represented by width W$_{NEW}$ in FIG. 2, to be wider than the width W$_{OLD}$ of the prior art trailer body 20 used with prior art brake systems, as represented in FIG. 3.

Figure 2A:
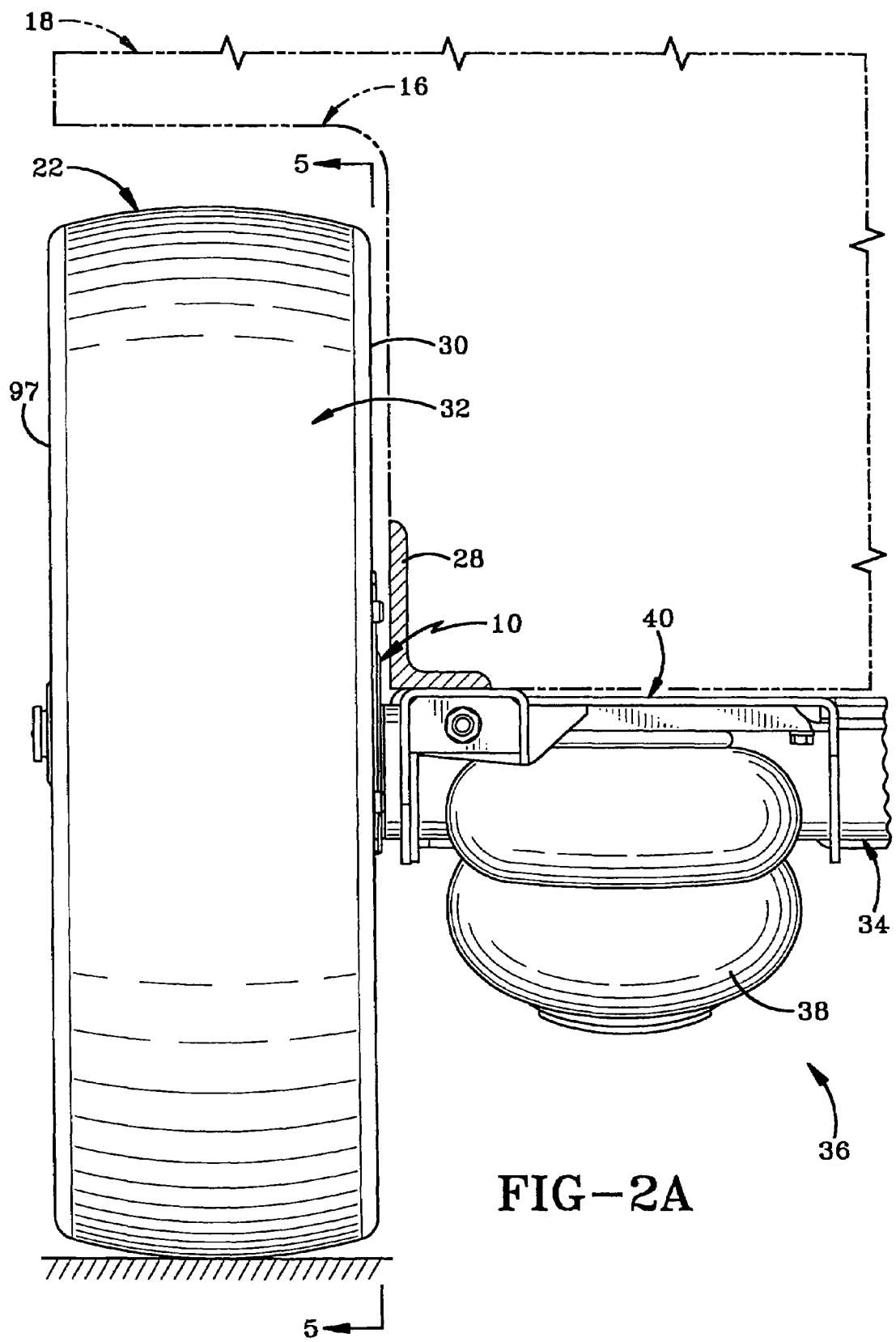
FIG. 2A is an enlarged fragmentary view of one of the wheels and a portion of the trailer body shown in FIG. 2.

To achieve this wider cargo space W$_{NEW}$, system 10 is situated substantially within the tire profile (defined further below) of each of trailer wheels 22 (FIG. 2). By contrast, the prior art brake systems 24 are situated predominantly inboard of wheels 26 of the prior art configuration (FIG. 3). As shown in FIG. 2A, system 10 protrudes from within the tire profile only slightly in an inboard direction beyond an inner edge 30 of a tire 32 of wheel 22, thereby allowing trailer frame 28 and trailer body 18 to be disposed closely adjacent to inner edge 30.

In addition, for vehicles affected by maximum width standards, it is important to minimize, and preferably eliminate, any protrusion in an outboard direction beyond an outer edge 97 of tire 32. System 10 is configured in accordance with this concept, so that, for example structure such as a rim 46 of wheel 22 does not extend outboard of outer edge 97. More particularly, this is important in relation to maximum width standards because any such outboard protrusion adds to the width of the vehicle, which must be compensated for by moving wheel 22 and related structure in an inboard direction to stay within the maximum width standards. This compensation thus requires the wheel boxes to be widened and consequently reduces the cargo space between the wheel boxes. It is noted that not all vehicles approach the maximum width standards and thus, for example, a rim extending outboard of the outer edge of the tire would not bring the maximum width standards into play. In this latter case, it is not critical to prevent an outboard protrusion as discussed above. Most typically, however, brake system 10 will used on vehicles where the maximum width standards are pertinent so that minimization or elimination of such outboard protrusions is an important aspect of the invention.

As brake system 10 is associated with each of wheels 22 and each system 10 is either identical or a mirror image of the other, only one will be described. Brake system 10 is mounted on frame 28 via an elongated axle 34 extending between wheels 22 (FIG. 2). Axle 34 is part of a suspension assembly 36 which further includes a dampening mechanism in the form of air spring 38 and trailer mounting structure 40. An air inlet 39 communicates with air spring 38. Other dampening mechanisms known in the art may take the place of air spring 38, such as leaf springs, coil springs, rubber blocks and so forth. A rotatable arm 39 (FIG. 4) is mounted on one end thereof to air spring 38 and on the other end thereof to a mounting member in the form of an elongated torque bar 42 via mounting bracket 41 (FIG. 6).

Figure 4:
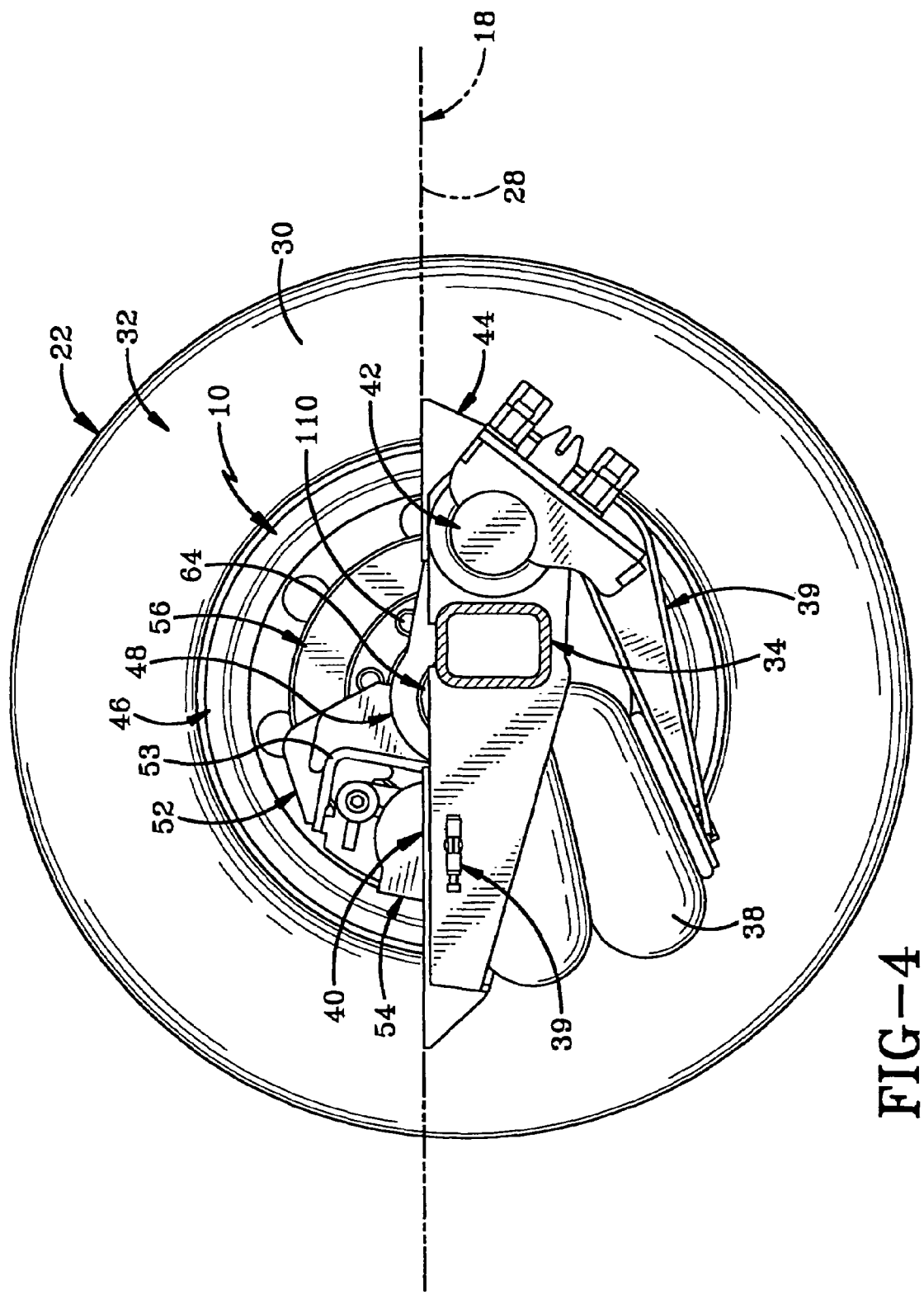
FIG. 4 is a sectional view taken on line 4-4 of FIG. 2.
Figure 5:
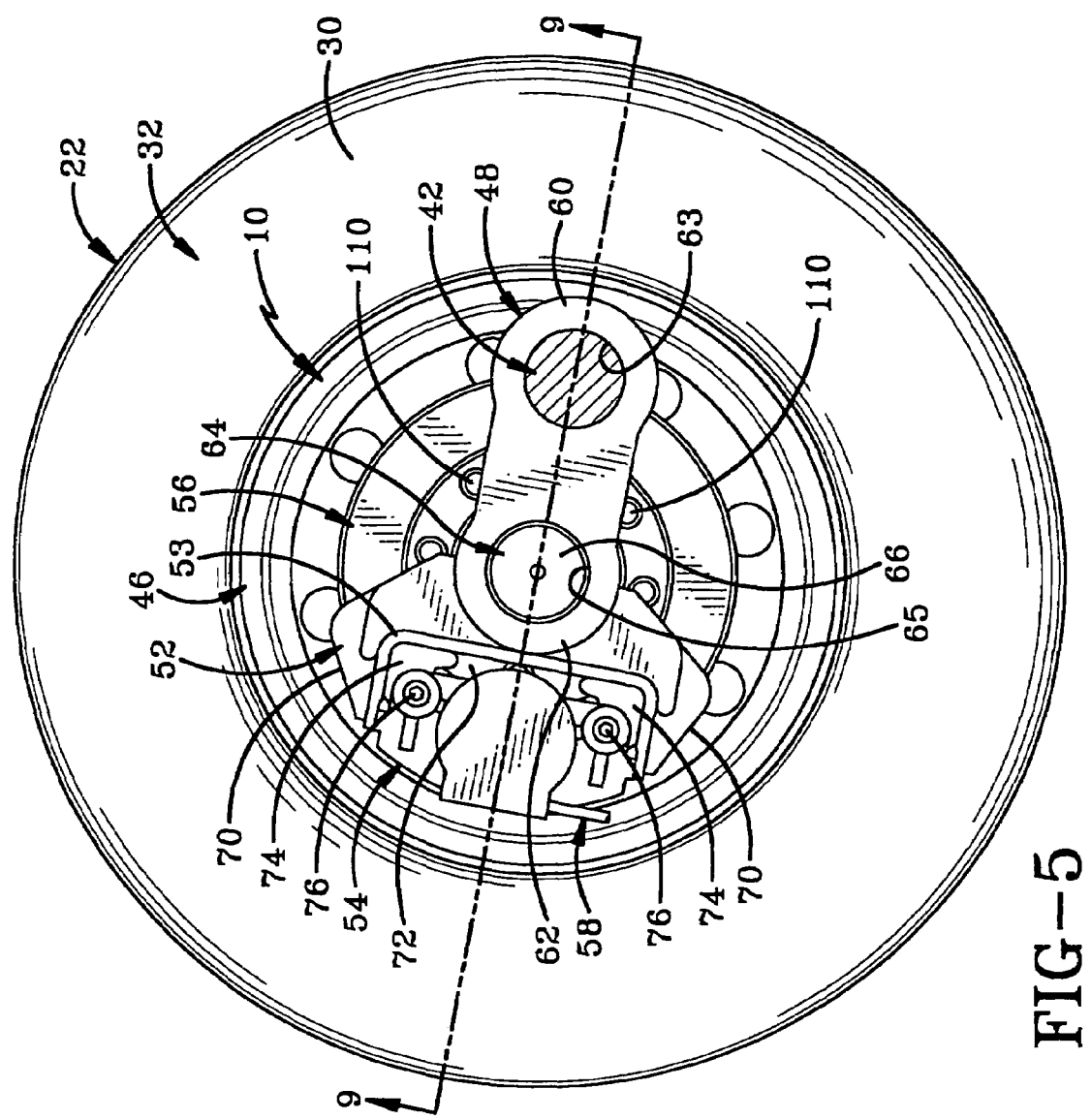
FIG. 5 is a sectional view taken on line 5-5 of FIG. 2A.
Figure 6:
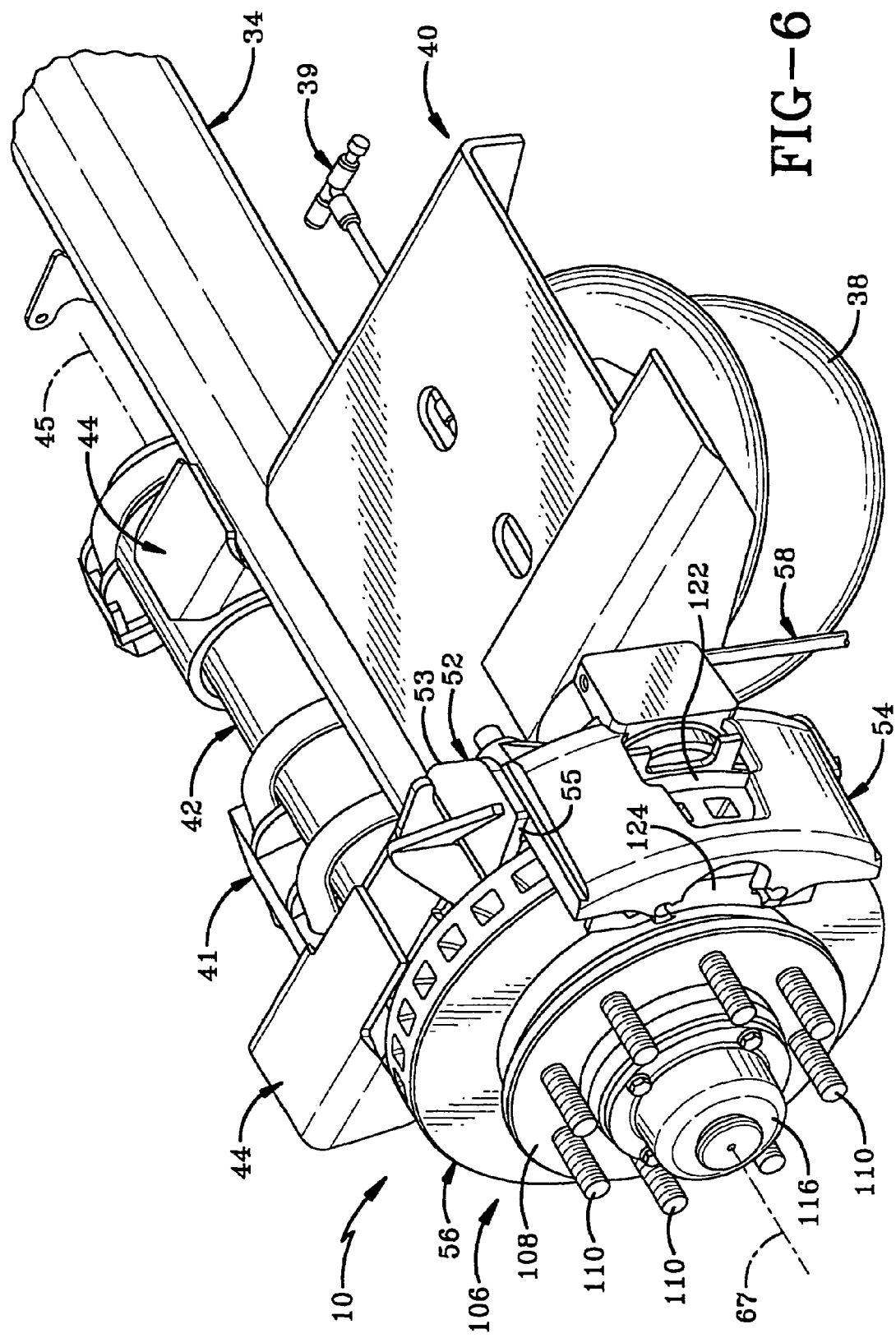
FIG. 6 is a fragmentary perspective view of the brake system of the present invention mounted on a vehicle frame.

With reference to FIGS. 4-6, system 10 is mounted to axle 34 via torque bar 42, which is rotatably mounted on axle 34 by a pair of spaced torque bar mounts 44. Torque bar 42 is rotatable about a longitudinal axis 45 extending in the elongated direction of torque bar 42 (FIG. 6). In accordance with a main feature of the invention, a substantial part of system 10 is disposed within rim 46 of each wheel 22, or more particularly, within a cavity 47 (FIG. 9) defined by rim 46. In particular, an elongated arm or spindle lever 48 arm having an inner edge 49 and an outer edge 51 is mounted adjacent an outboard end 50 (FIG. 8) of torque bar 42 and a caliper bracket 52 having an inner edge 53 (FIGS. 5, 6, 8A and 9) and an outer edge 55 (FIGS. 6, 8A and 9) is mounted directly to spindle lever 48. A brake caliper 54 is removably mounted on caliper bracket 52 for selectively brakingly engaging a brake rotor 56 as a result of selectively pressurized hydraulic fluid flowing through brake line 58 (FIG. 6).

Figure 8A:
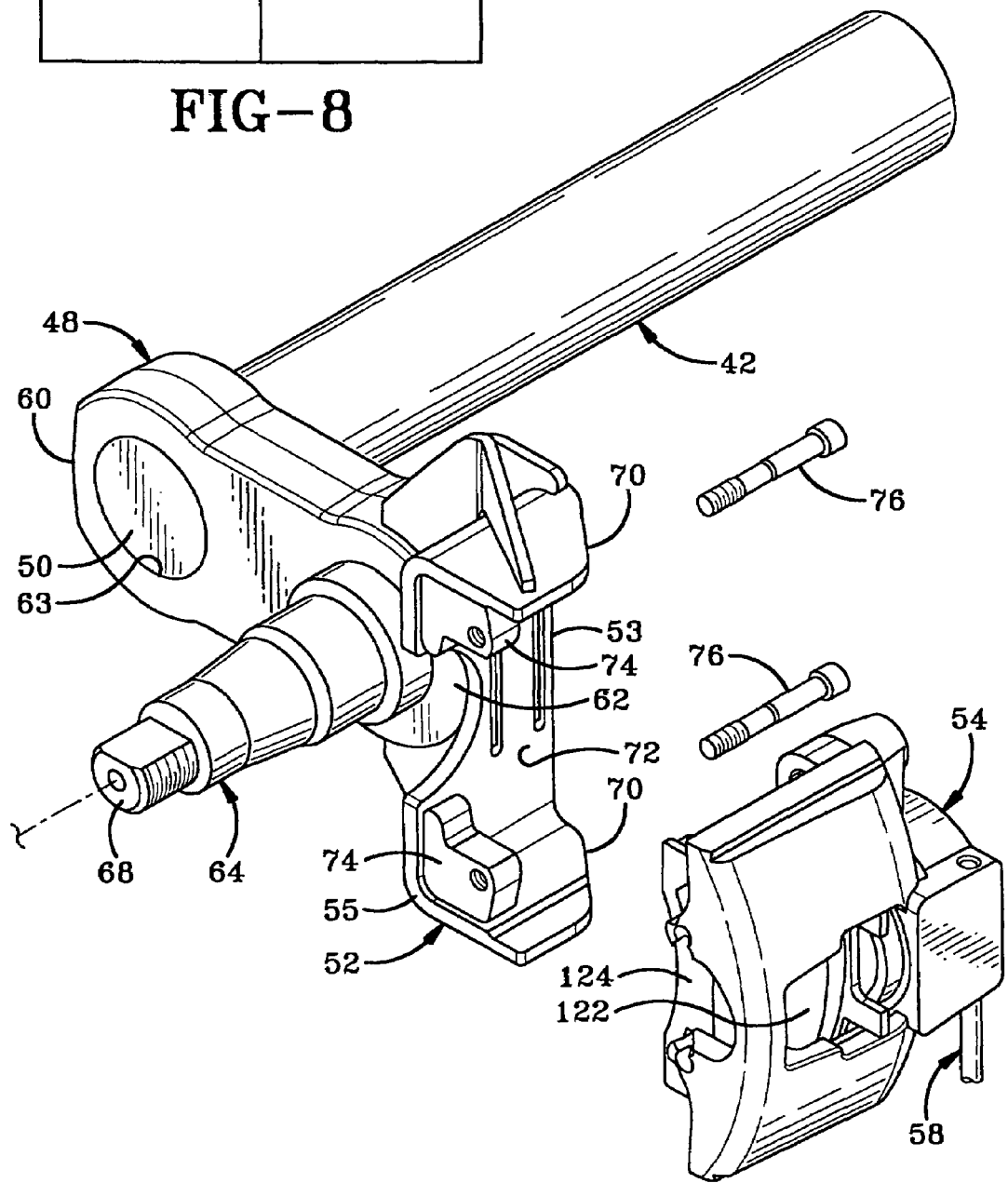
FIG. 8A is an exploded perspective view of a portion of the brake assembly shown in FIG. 6.
Figure 9:
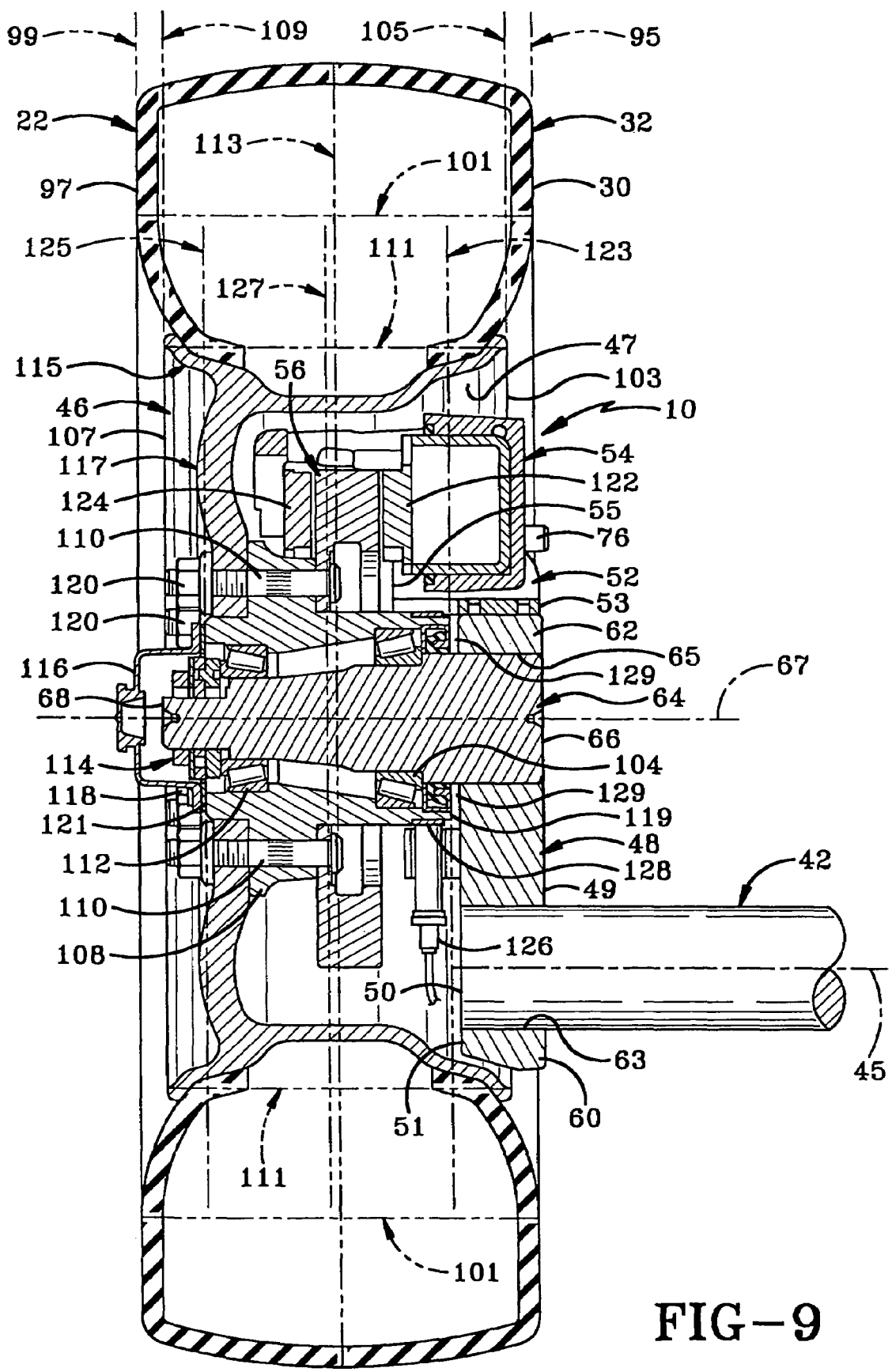
FIG. 9 is a sectional view taken on line 9-9 of FIG. 5.

With reference to FIG. 5, spindle lever 48 is rigidly attached adjacent a first end 60 thereof to torque bar 42 and rigidly attached adjacent a second end 62 of spindle lever 48 to an elongated spindle 64 having an inner edge 66 (FIGS. 5 and 9) and an outer edge 68 (FIGS. 8A and 9). Spindle 64 is configured for mounting wheel 22 thereon rotatably about a longitudinal axis 67 extending in the elongated direction of spindle 64 and substantially parallel to axis 45 of torque bar 42 (FIG. 6). More particularly, torque bar 42 and spindle 64 are received within respective holes 63 and 65 formed in spindle lever 48. Torque bar 42 and spindle 64 are substantially parallel to one another and spindle lever 48 extends substantially perpendicularly between torque bar 42 and spindle 64. Caliper bracket 52 is rigidly mounted to spindle lever 48 adjacent second end 62 thereof and extends outwardly in a direction away from first end 60 of spindle lever 48. Caliper bracket 52 is also generally elongated in a direction perpendicular to the elongated direction of spindle lever 48. Bracket 52 may be attached to spindle lever 48 by welding, fasteners or other means known in the art. In addition, spindle lever 48 and bracket 52 may be formed as a one-piece integral member, preferably as forged or cast metal. Taken together, spindle lever 48 and bracket 52 form a generally Y-shaped member wherein bracket 52 is a yoke sitting atop spindle lever 48, which is an upright of the Y-shaped member. Bracket 52 includes a pair of spaced laterally extending arms 70 defining an interior space 72 there between. A mounting flange 74 extends from each arm 70 into interior space 72. Brake caliper 54 is fastened to caliper bracket 52 with bolts 76, which engage respective mounting flanges 74 whereby a portion of brake caliper 54 is received within space 72.

Figure 7:
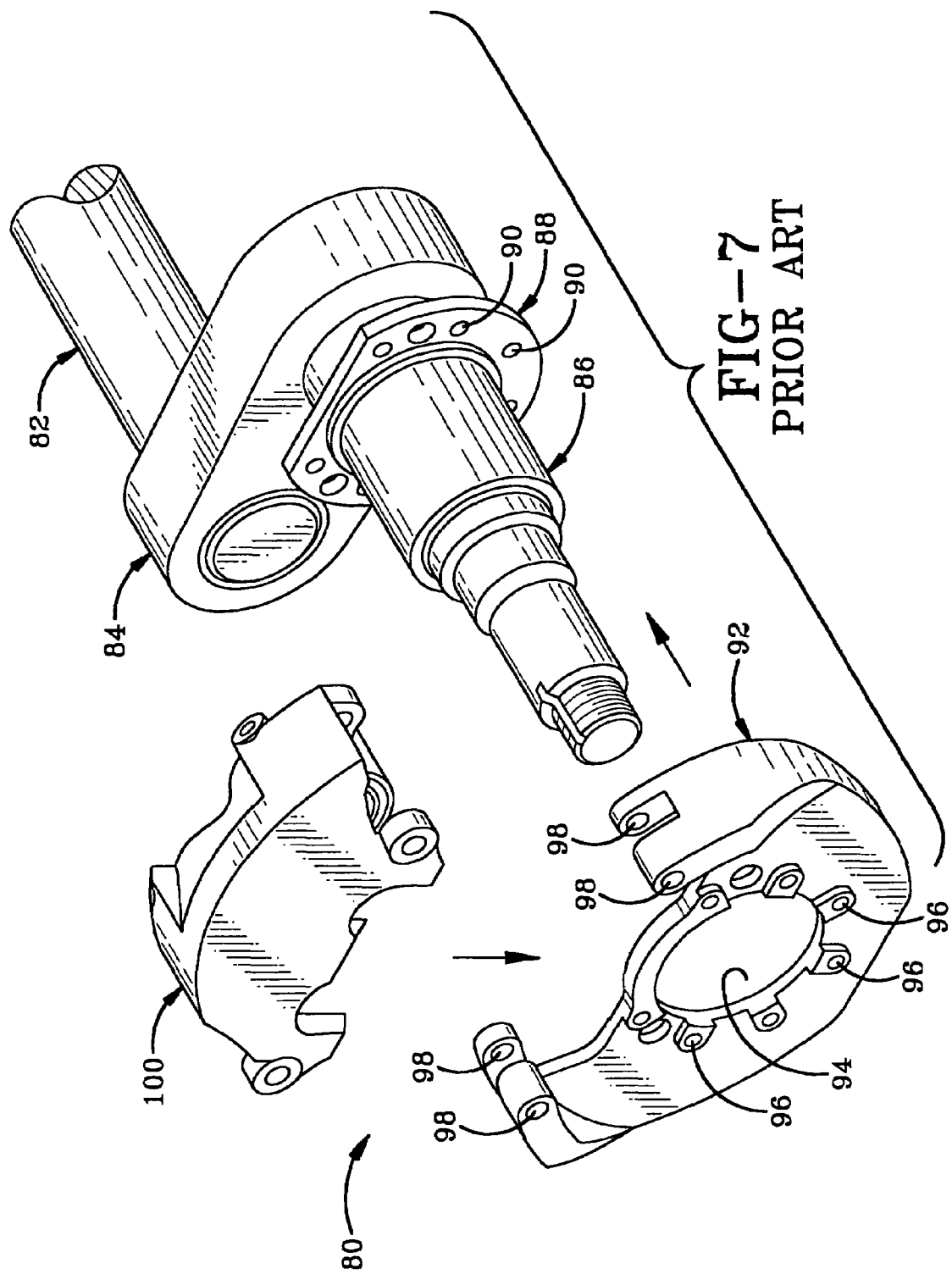
FIG. 7 is an exploded perspective view of a prior art brake assembly.

With reference to FIG. 7, a prior art brake system 80 is described to show the contrast with system 10. System 80 includes a torque bar 82 with a spindle lever 84 mounted thereon. A spindle 86 extends from spindle lever 84 and a brake flange 88 extends radially outwardly from spindle 86 and defines a plurality of mounting holes 90. System 80 further includes a caliper bracket 92 defining a central hole 94 surrounded by a plurality of radially spaced mounting holes 96 which align with mounting holes 90 of bracket flange 88 whereby fasteners (not shown) are received through respective holes 96 and 90 to mount caliper bracket 92 to brake flange 88 with hole 94 of bracket 92 receiving spindle 86 therein. Caliper bracket 92 further includes two sets of caliper mounting holes 98. System 80 further includes a brake caliper 100 which is mounted to caliper bracket 92 via holes 98 thereof.

With reference to FIGS. 8-9 and in accordance with a main feature of the invention, system 10 obviates the need for a brake flange such as brake flange 88 of system 80 which is mounted on a spindle such as spindle 86 (FIG. 7). The mounting of caliper bracket 52 on spindle lever 48 allows system 10 to be free of such a brake flange extending radially from spindle 64. The elimination of such a brake flange allows system 10 to be far more compact than conventional brake systems. Thus, the profile of system 10 is substantially narrower than conventional brake systems and fits substantially within rim 46 of wheel 22, allowing for a narrower wheel box 16 and thus providing additional space to widen the cargo area of trailer body 18 between wheel boxes 16, as previously noted.

More particularly and with reference to FIG. 9, most of the components of system 10 fit substantially within a tire profile of tire 32. For the purposes of this application, the tire profile of tire 32 is defined as follows. Annular inner edge 30 of tire 32 lies in a substantially vertical imaginary inner plane 95 whereby the intersection of inner edge 30 and plane 95 substantially defines a circle. Tire 32 also has an annular outer edge 97 which lies in a substantially vertical imaginary outer plane 99 whereby the intersection of outer edge 97 and outer plane 99 substantially defines a circle. Inner plane 95 and outer plane 99 are substantially parallel to one another. The tire profile of tire 32 lies between inner plane 95 and outer plane 99, being bound thereby. The tire profile of tire 32 also has a circumferential boundary which is substantially cylindrical. In particular, the circumferential boundary is defined by a cylinder 101 defined by each of the circles previously noted, that is, the circle defined by the intersection of inner plane 95 and inner edge 30 of tire 32 and the circle defined by the intersection of outer plane 99 and outer edge 97 of tire 32.

Similarly, rim 46 defines a rim profile, detailed below. Rim 46 includes a tire receiving annular wall 115 and a mounting wall 117 for mounting rim 46 to a hub 108. Mounting wall 117 is connected to annular wall 115 along the interior of annular wall 115 along a substantially circular intersection between walls 115 and 117. Rim 46 has an annular inner edge 103 on wall 115 which lies in a substantially vertical plane 105 whereby the intersection of inner edge 103 and inner plane 105 defines a circle. Rim 46 also has an annular outer edge 107 on wall 115 which lies in a substantially vertical outer plane 109 whereby the intersection of outer edge 107 and outer plane 109 define a circle. The rim profile lies between and is bounded by inner plane 105 and outer plane 109. Inner plane 105 and outer plane 109 are substantially parallel to one another. The rim profile is also bounded by a cylinder 111 defined by the previously noted circles of the intersections of inner edge 103 and inner plane 105 and the intersection of outer edge 107 and outer plane 109. The rim profile lies within cylinder 111. Rim 46 also has a central plane 113 which lies halfway between inner plane 105 and outer plane 109 and is substantially parallel with each of these planes. Central plane 113 also lies midway between inner plane 95 and outer plane 99 of tire 32 although an altered configuration of the tire could offset a central plane of the tire with respect to a central plane of the rim.

Figure 8B:
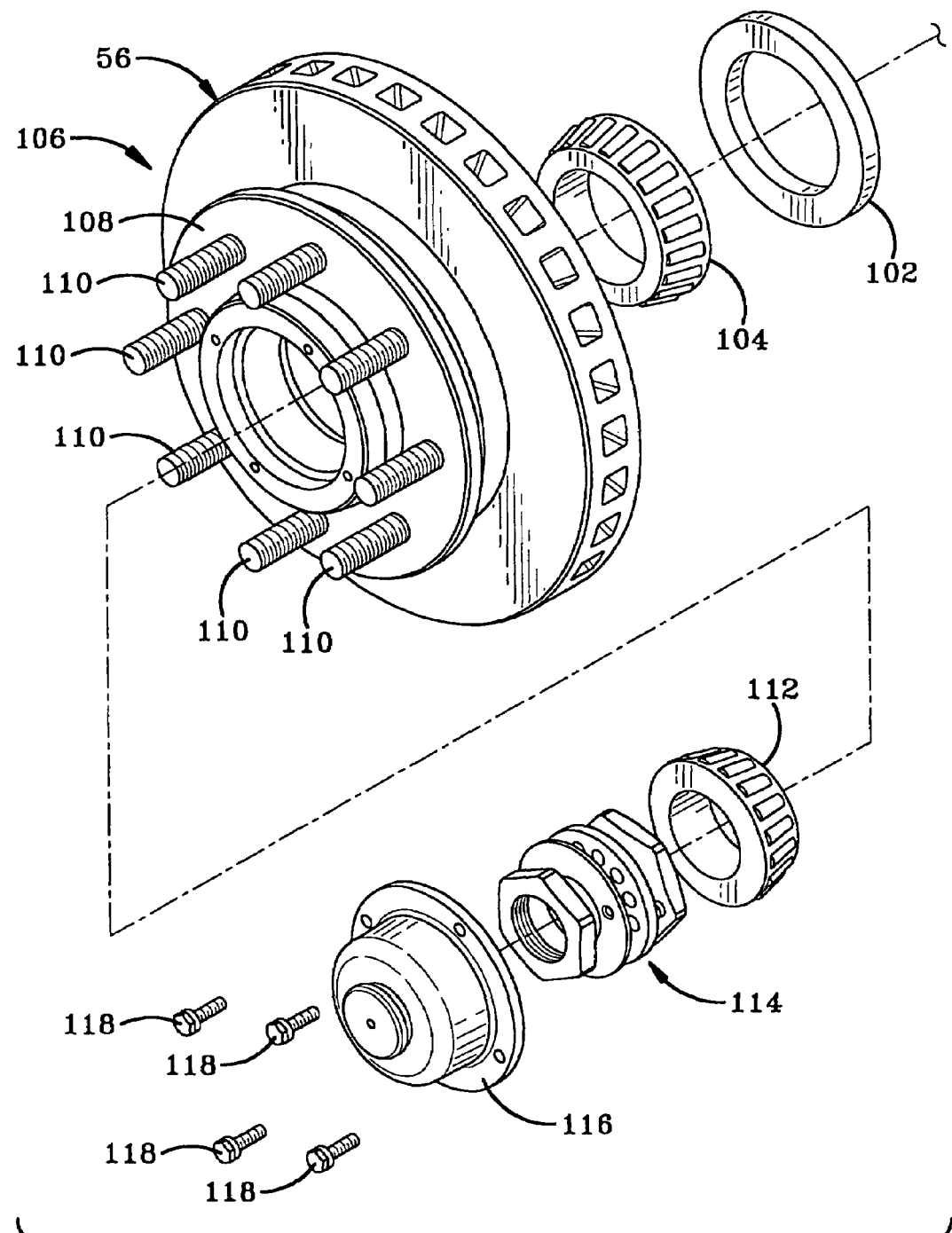
FIG. 8B is an exploded perspective view of the other portion of the brake system shown in FIG. 6.

FIGS. 8A and 9 clearly show that system 10 is free of a brake flange such as the prior art brake flange 88 (FIG. 7) extending from spindle 64. FIG. 8B shows an exploded view of the various parts which are mounted on spindle 64 when assembled. These parts include a seal 102, an inner bearing 104 and a hub and rotor assembly 106, which includes brake rotor 56 and hub 108, which is rotatably mounted on spindle 64 about axis 67. Rotor 56 and hub 108 are connected with bolts 110 extending through corresponding aligned holes in rotor 56 and hub 108. The parts for mounting on spindle 64 further include an outer bearing 112, bearing retaining nuts and washers 114, an oil cap 116 and bolts 118 for mounting oil cap 116 to hub 108. FIG. 9 shows these parts mounted on spindle 64 along with wheel 22 whereby rim 46 is mounted on hub 108 via bolts 110 and corresponding nuts 120. Caliper 54 includes an inner brake pad or friction pad 122 and an outer brake pad or friction pad 124 disposed on opposite sides of rotor 56. System 10 may also include an antilock brake system (ABS) including an ABS sensor 126 and an ABS tone ring 128.

With continued reference to FIG. 9, hub 108 has an annular inner edge 119 and an annular outer edge 121, each of which is substantially perpendicular to axis 67. Inner edge 119 of hub 108 lies in a substantially vertical imaginary inner plane 123. Outer edge 121 lies in a substantially vertical imaginary outer plane 125. Inner plane 123 and outer plane 125 are substantially parallel to one another. Hub 108 also has a central plane 127 which lies halfway between inner plane 123 and outer plane 125 and is substantially parallel with each of these planes.

In accordance with the invention, the configuration of the various parts of system 10 make it compact and allow it to fit substantially or entirely within the tire profile and substantially within the rim profile. The relationship between the parts is more particularly described below with reference to FIG. 9. Brake rotor 56 is mounted on hub 108 entirely between inner edge 119 and outer edge 121 of hub 108. More particularly, rotor 56 is intersected by central plane 127 of hub 108. Brake caliper 54 is mounted on spindle 64 adjacent inner edge 66 of spindle 64. In particular, brake caliper 54 is mounted on spindle 64 via caliper bracket 52 so that inner edge 53 of the caliper bracket 52 is substantially aligned with inner edge 66 of spindle 64. Brake caliper 54 is disposed entirely between the inner edge 53 and outer edge 55 of spindle 64. Friction pads 122 and 124 are disposed entirely between inner edge 119 and outer edge 121 of hub 108. Outer edge 51 of spindle lever 48 and inner edge 119 of hub 108 are closely adjacent one another and define there between a narrow annular space 129 within which no structure is disposed.

In accordance with a feature of the invention and with reference to FIG. 9, a substantial portion of system 10 is disposed on the outboard side of inner plane 95 defined by inner edge 30 of tire 32. More simply, a substantial portion of system 10 is disposed outboard of inner edge 30. A substantial portion of system 10 is also disposed on the outboard side of inner plane 105 associated with rim 46, or more simply, outboard of inner edge 103 of rim 46. In particular, brake caliper 54 is entirely on the outboard side of plane 95 and within the tire profile. Caliper 54 is also substantially on the outboard side of plane 105 and within the rim profile. Each of caliper bracket 52 and spindle lever 48 are disposed substantially on the outboard side of inner plane 95 and within the tire profile while also over half of each of bracket 52 and spindle lever 48 are disposed on the outboard side of inner plane 105 and within the rim profile. Thus, each of brake caliper 54, caliper bracket 52 and spindle lever 48 are disposed entirely inboard of outer edge 97 of tire 32. Each of spindle lever 48 and torque bar 42 extend radially outwardly from axis 67 no further than does substantially circular inner edge 30 of tire 32 and no further than does substantially circular inner edge 103 of rim 46.

In addition, spindle 64 is disposed substantially on the outboard side of planes 95 and 105 and substantially within the tire profile and the rim profile. In particular, spindle 64 has a substantially horizontal longitudinal length L (FIG. 10) at least 90% of which is preferably within the tire profile and at least 80% of which is preferably within the rim profile. Outboard end 50 of torque bar 42 is also disposed within the tire profile and the rim profile. Spindle 64 and torque bar 42 are disposed entirely inboard of outer edge 97 of tire 32. Rotor 56 is entirely within the tire and rim profiles and more particularly is intersected by central plane 113 and is nearly centered within rim 46 and tire 32. Mounting wall 117 is offset from central plane 113 on the outboard side thereof. In particular, mounting wall 117 is entirely disposed between central plane 113 and outer plane 109 so that no portion of mounting wall 117 is outside of the rim profile or the tire profile. The offset aspect of wall 117 allows the various brake components to fit substantially within space 47 of rim 46. Keeping wall 117 inboard of outer edge 97 of tire 32 is important in relation to the concept discussed earlier of minimizing outboard protrusions with respect to maximum vehicle width standards so as to maximize the cargo space between wheel boxes 16. However, even where some wheel component or other component such as oil cap 116 extends a short distance outboard of outer edge 97 of tire 32, the increase thereby of the trailer width may be sufficiently minimal so that any resulting loss of cargo space is offset by the substantial increase in cargo space between wheel boxes 16. In addition, where a given vehicle does not approach the maximum width standard, extensions outboard of outer edge 97 often will not present an issue regarding this standard.

In operation, friction pads 122 and 124 move between a non-braking position indicated in FIG. 10 and a braking position indicated in FIG. 11. The non-braking position in FIG. 10 is exaggerated for clarity, although as known, pads 122 and 124 normally are in contact with rotor 56 under minimal frictional engagement in the non-braking position. As known in the art, application of a brake pedal (not shown) pressurizes hydraulic fluid 130 to activate friction pads 122 and 124 in the direction indicated by Arrows A in FIG. 11 to apply braking force to rotor 56. Release of the brake pedal relieves the pressure on the hydraulic fluid 130 which relieves the force on pads 122 and 124, thereby relieving the braking force applied to rotor 56. Thus, the basic operation of friction pads 122 and 124 in applying pressure to rotor 56 is conventional.

Because system 10 involves the use of spindle lever 48 and torque bar 42 which is mounted on axle 34, the function of these members is also briefly described. As a vehicle such as trailer 12 travels down the road, wheel 22 and spindle 64 move up and down in response to bumps and dips in the road. This movement is translated via spindle lever 48 to rotate wheel 22 and spindle 64 about torque bar 42. The rotational movement of torque bar 42 about axis 45 is further translated through rotatable arm 39, which is rigidly attached to torque bar 42, whereby the up and down movement of wheel 22 is ultimately reacted by air spring 38 to dampen said movement.

Figure 12:
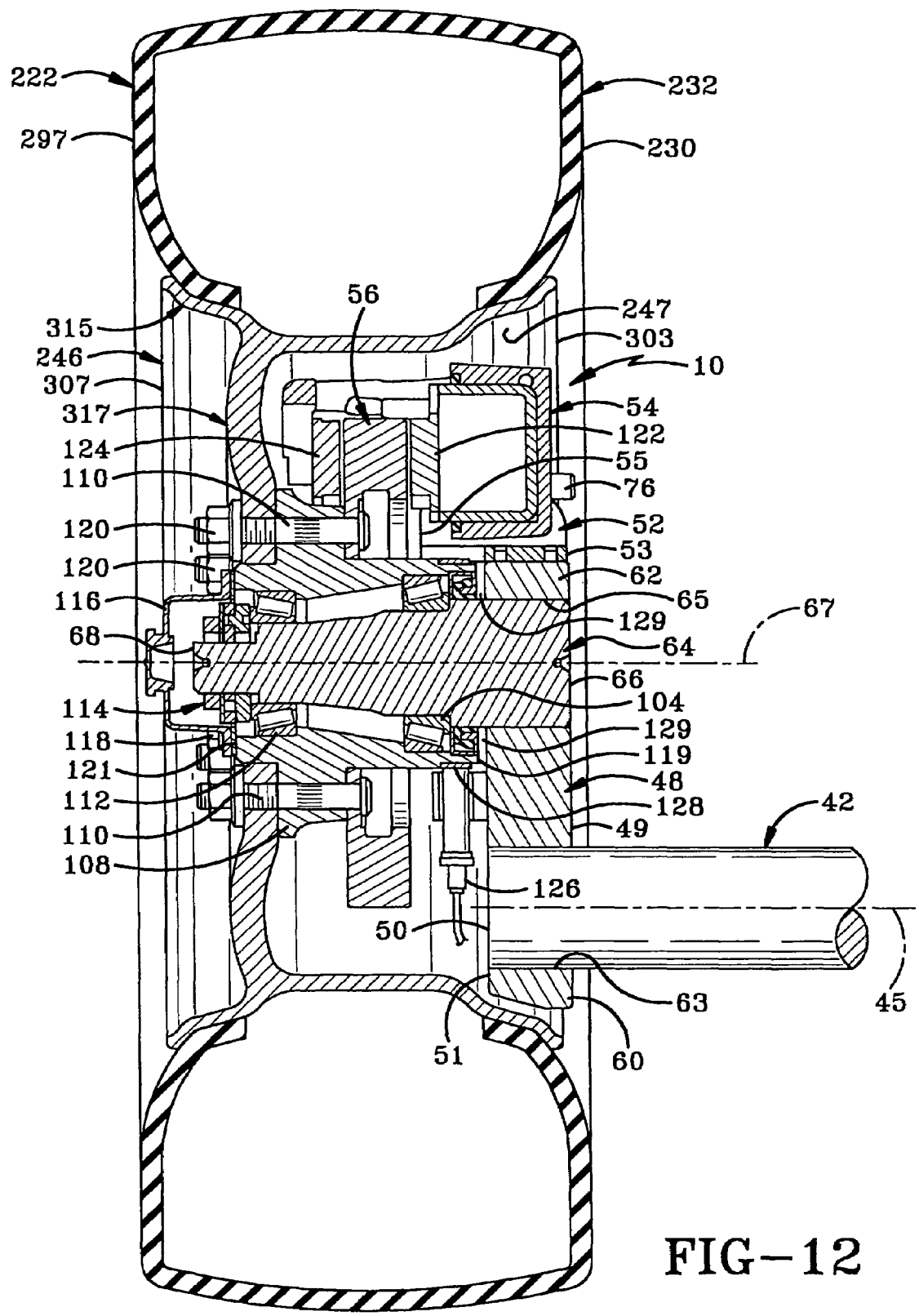
FIG. 12 is similar to FIG. 9 except it shows a wheel with a wider profile.

FIG. 12 shows system 10 in use with a wheel 222 having a rim 246 and tire 232 each of which is wider than rim 46 and tire 32. Tire 232 has an inner edge 230 and an outer edge 297. The tire profile of tire 232 is defined in a manner analogous to that of tire 32. Rim 246 defines a cavity 247 and includes a tire receiving annular wall 315 and a mounting wall 317 connected to annular wall 315 along the interior thereof along a substantially circular intersection between walls 315 and 317. Rim 246 has an inner edge 303 on wall 315 and an outer edge 307 on wall 315. The rim profile of rim 246 is defined in an analogous manner to that of rim 46. FIG. 12 shows that the relative sizes of tire 232, rim 246 and system 10 may vary somewhat so that all of the components of system 10 other than torque bar 42 are entirely disposed outboard of inner edge 230 and within the tire profile. More particularly, spindle lever 48, caliper bracket 52 and spindle 64 may also be entirely outboard of inner edge 230 and entirely within the tire profile and thus entirely inboard of outer edge 97 of tire 32. While not shown, these components may also be configured to fit entirely within the rim profile. However, the more important aspect is to be disposed outboard of inner edge 230 of tire 232. When these components are entirely outboard of inner edge 230, then tire 232 itself is the only limiting factor for expanding the width of a trailer such as trailer body 18 situated between a pair of wheels such as wheels 222. With regard to the maximum width standards previously discussed, it is noted that oil cap 116 and indeed all components of wheel 222 and brake system 10 are disposed entirely inboard of outer edge 297 of tire 232. Stated another way, no portion of wheel 222 or system 10 are disposed outboard of outer edge 297.

Thus, brake system 10 provides a narrow-profile brake system configured to fit substantially within the profile of rim 46 and substantially within the profile of tire 32. Preferably, all the components of system 10 other than torque bar 42 are on the outboard side of the inner plane bounding the tire profile. The narrow profile of system 10 is made possible by the elimination of a brake flange such as prior art brake flange 88 on a spindle such as spindle 64 and the corresponding mounting of a caliper bracket such as prior art bracket 92 on brake flange 88. The system 10 configuration is permitted by the mounting of caliper bracket 52 on spindle lever 48, which reduces the width or profile needed to provide a functional brake system. Shifting mounting wall 117 away from inner plane 113 in an outboard direction while remaining inboard of outer plane 109 also permits system 10 to remain within the tire profile to maximize cargo space for vehicles which are wide enough to be affected by maximum width standards. In addition, the various parts of system 10 are configured in a compact manner, as previously described, to allow maximization of the cargo space at issue.

Figure 13:
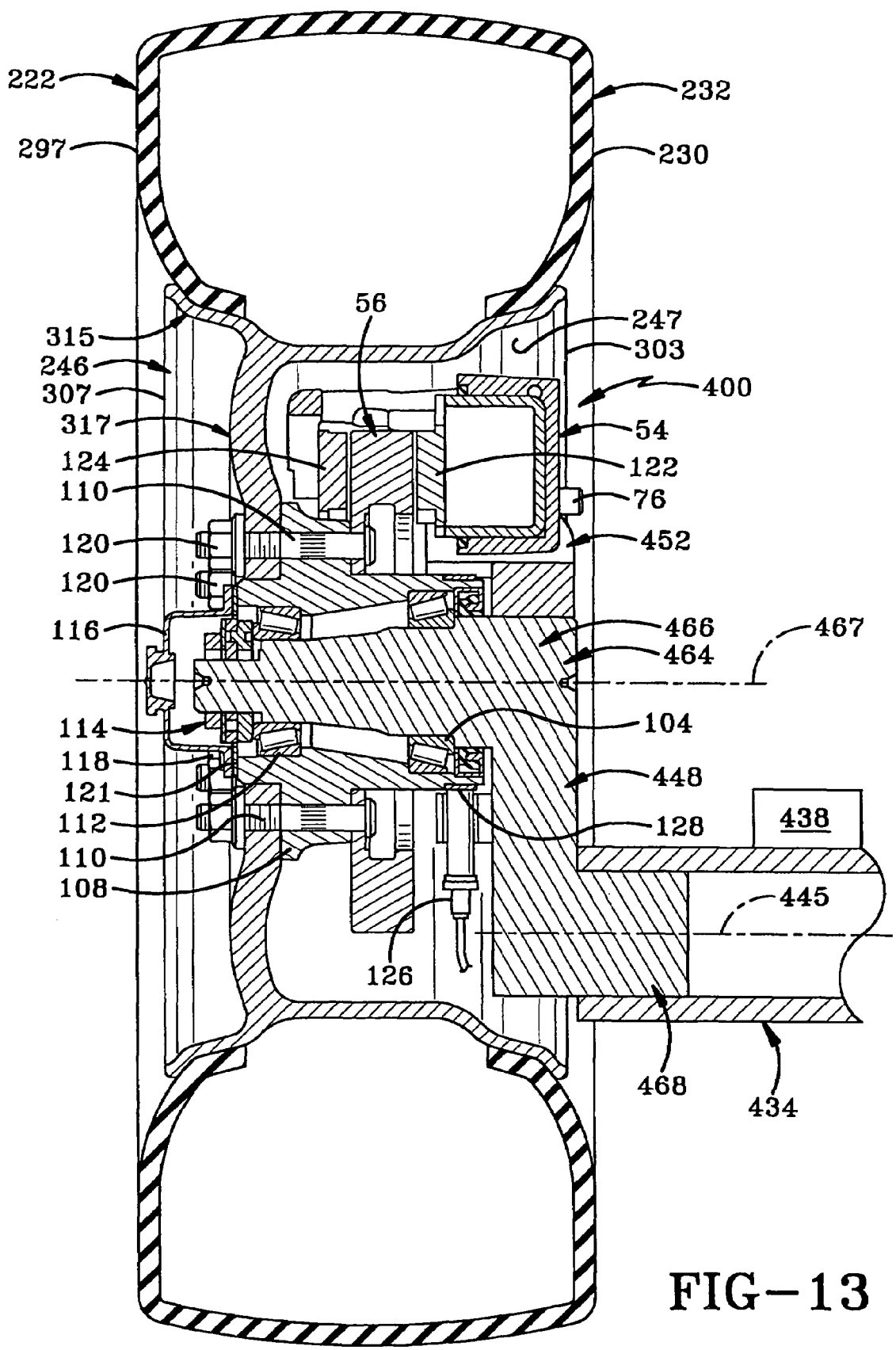
FIG. 13 is similar to FIG. 12 and shows a second embodiment of the present invention using a drop center spindle.

System 400 is shown in FIG. 13 and is similar to system 10 except that a drop center spindle 464 is used instead of a spindle lever so that a modified caliper bracket 452 is connected to spindle 464. Drop center spindle 464 includes a spindle member or spindle shaft 466 having a central longitudinal axis 467 and disposed in a position analogous to that of spindle 64 of system 10. Spindle 464 further includes a drop arm 448 extending downwardly from spindle shaft 466 perpendicularly thereto in a position similar to that of spindle lever 48 of system 10. A mounting member or structure 468 extends from arm 448 in a direction opposite that of spindle shaft 466 and is received within an axle 434 whereby spindle 464 is mounted on a vehicle frame. Axle 434 has a central longitudinal axis substantially parallel with axis 467 of spindle shaft 467. Mounting structure 466 may take any suitable configuration for mounting on an axle or directly onto a vehicle frame. Drop center spindle 464 is an integral one-piece member, which is common, but may also be formed of separate members. A dampening mechanism 438, diagrammatically shown, is mounted to axle 434 and is disposed generally above axle 434, although it may also be below or beside axle 434. As noted with system 10, air springs, coil springs, leaf springs, rubber blocks and the like may be used to provide the dampening mechanism.

As with spindle lever 48 of system 10, arm 448 is disposed entirely outboard of the inner edge 230 of tire 232 and within the tire profile. Arm 448 is also substantially outboard of inner edge 303 of rim 246. Arm 448 may also be partially outboard of inner edge 230, as shown by analogy with regard to spindle lever 48 in FIG. 9. Arm 448, and thus drop center spindle 464, extends radially outwardly from axis 467 no further than does substantially circular inner edge 230 of tire 232 and no further than does substantially circular inner edge 303 of rim 246.

In light of the similarities between systems 10 and 400, it is noted that with regard to system 10, spindle 64 in combination with spindle lever 48 may be deemed a spindle whereby spindle 64 is a spindle member and spindle lever 48 is an arm extending transversely therefrom. Spindle 64 and spindle lever 48 may be formed as an integral one-piece member, such as forged or cast metal. As suggested by the possibility of integrally forming spindle lever 48 and caliper bracket 52, the formation of spindle 64, spindle lever 48 and bracket 52 may also be as an integral one-piece member.

Figure 14:
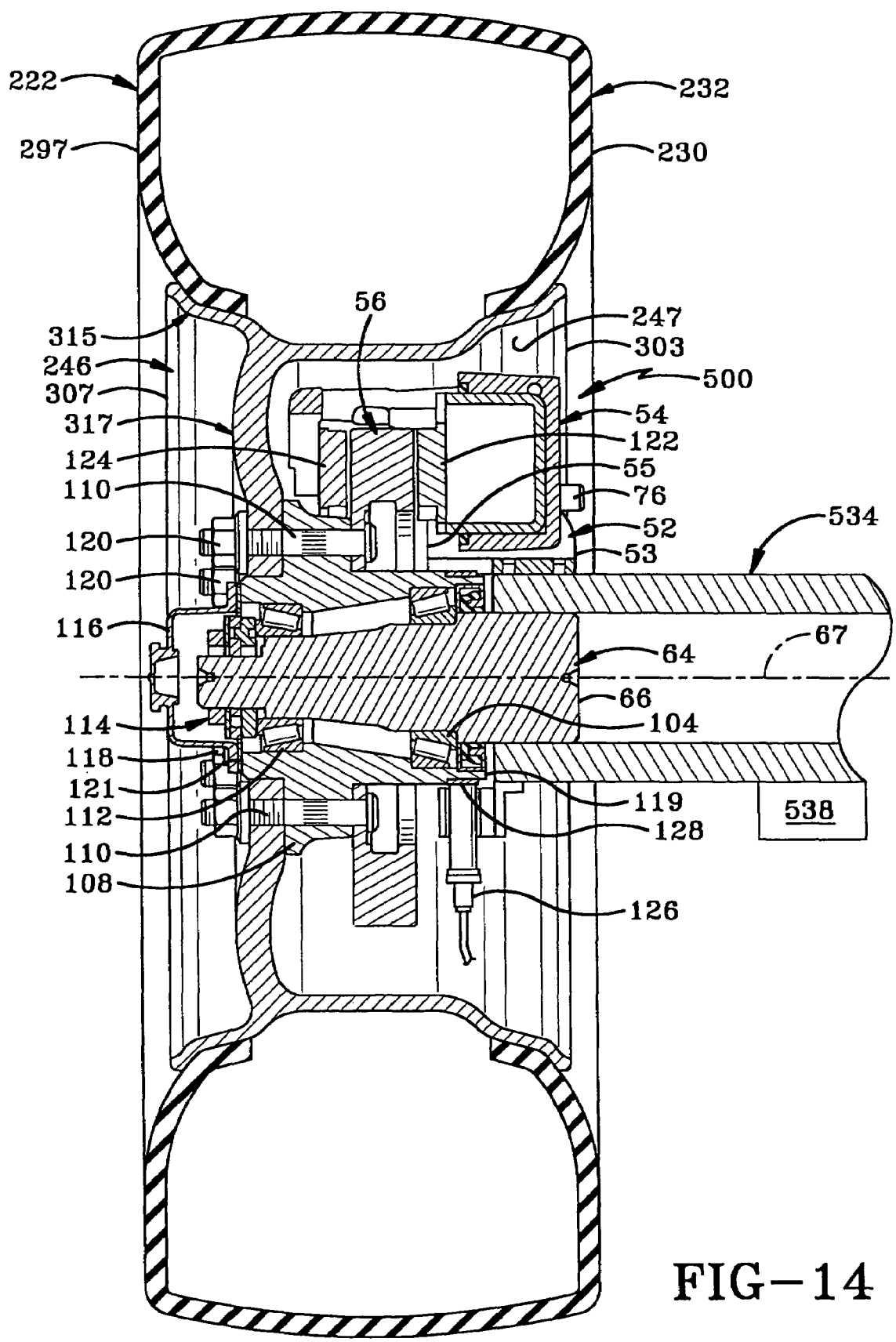
FIG. 14 is similar to FIG. 12 and shows a third embodiment of the present invention with a spindle connected to an axle.

System 500 is shown in FIG. 14 and similar to systems 10 and 400 except it eliminates the spindle lever or drop arm and instead connects spindle 64 directly to an axle 534 which extends substantially from one side of the vehicle to the other, similar to axle 34 in FIG. 2, with one end of axle 534 adjacent one side of the vehicle and the other end of axle 534 adjacent the other side of the vehicle. Axle 534 is elongated and has an axis which extends in the elongated direction of axle 534 and which is substantially coaxial with axis 67 of spindle 64. Spindle 64 is received within axle 534 and fixedly mounted thereto. This is often done by swaging or crimping of the end of the axle about the spindle and welding the two together. The axle and spindle may also be formed as a one-piece integral structure.

Brake caliper 54 is mounted to spindle 64 via axle 534 and caliper bracket 52, the latter being connected to axle 534. As shown with system 400, a modified caliper bracket may also be connected directly to spindle 64 where a modified spindle extends further inboard so that axle 534 is attached to spindle 64 further inboard to expose spindle 64 to such direct connection. A dampening mechanism 538, shown diagrammatically, is mounted to axle 534 and is disposed below axle 534, although it may also be above or beside axle 534, and includes the options noted above with regard to the other embodiments.

Spindle 64 is entirely outboard of inner edge 230 of tire 232 although it may extend further inboard in the third embodiment than with the first two embodiments, since its connection to axle 534 prevents it from limiting the width of the cargo space added by the configuration of system 500.

One skilled in the art will appreciate that a variety of changes can be made to brake systems 10, 400 and 500 which are within the scope of the present invention, some of which are noted below. Caliper bracket 52 and spindle lever 48 of brake system 10 are described generally as a Y-shaped member. However, this could vary quite a bit. Clearly, a spindle lever need not be an elongated member as long as it is capable of translating rotational movement of the spindle to a torque bar. Preferably, an alternate spindle lever would be dimensioned to be received at least partially within the tire profile. Similarly, a caliper bracket need not be in the form of a yoke, but more importantly be configured for the mounting of a suitable brake caliper. In addition, when used on typical tires and rims, a brake caliper should typically be configured to be at least partially received within rim 46 to maintain a narrower brake system profile to allow an enlarged cargo area. Typically, a caliper bracket such as bracket 52 will be substantially or entirely within the tire profile, although even if it is not, cargo space between the wheels may still be substantially increased. Further, a caliper bracket need not be mounted at the extreme end of a spindle lever opposite from the mounting of the torque bar, but may be mounted in any suitable location on the spindle lever which allows for increased cargo space between the wheels.

In addition, a brake caliper may be mounted directly to an altered form of the spindle lever such that there is no distinct caliper bracket. Such an altered configuration may require that the brake caliper also have an altered configuration. This concept is in keeping with the earlier noted preference of forming the caliper bracket and the spindle lever as an integral one-piece member, but also allows for a variety of options by which the brake caliper may be mounted to the spindle lever in order to eliminate the prior art brake flange extending from the spindle and thereby narrow the width of the brake system.

Another option is to mount a caliper bracket directly to a spindle where the spindle lever does not extend outwardly from the spindle in some areas. As an example, brake system 400 shows this concept wherein caliper bracket 452 is mounted directly to drop center spindle 464.

It is also understood that on some rims, the mounting wall of the rim extends outwardly of the annular tire receiving wall. In such a case, the rim profile may still be considered as being between the inner and outer edges of the annular tire receiving wall. It is further noted that the spindle and the various components of the brake system may extend beyond the outer plane of the tire or rim without departing from the spirit of the invention. Nonetheless, it is generally preferred for these components to be inboard of the outer edge of the tire in order to provide a more streamlined overall profile to reduce wind resistance, reduce potential damage to the wheel and related structure and for safety purposes.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A brake system for a vehicle having a frame, the system comprising:
    a spindle including a spindle member having a first axis and an arm which is rigidly connected to and extends radially outwardly from the spindle member;
    a rim which is rotatable with respect to the spindle member about the first axis and which has a substantially circular inboard edge;
    a brake rotor which is rotatable with respect to the spindle member about the first axis; wherein the brake rotor has a substantially circular outer perimeter;
    a brake caliper for selectively brakingly engaging the brake rotor; wherein the brake caliper is rigidly mounted on the spindle and is disposed at least partially outboard of the inboard edge of the rim;
    a dampening mechanism adapted to mount on the frame of the vehicle and
    a mounting member adapted to be rotatably mounted on the frame of the vehicle;
    wherein the arm is disposed at least partially outboard of the inboard edge of the rim;
    wherein the arm extends radially outwardly from the first axis no further than does the inboard edge of the rim;
    wherein the arm extends radially outwardly from the first axis at least as far as does the outer perimeter of the brake rotor;
    wherein the arm is rigidly mounted on the mounting member; and
    wherein the arm extends between the spindle member and the mounting member whereby vertical movement of the spindle is reacted in the dampening mechanism via rotation of the arm and the mounting member.

2. The system of claim 1 wherein the spindle, rim, brake rotor and brake caliper are rotatable as a unit about a second axis which is offset from the first axis whereby the unit is adapted to be rotatably mounted on the frame of the vehicle about the second axis.

3. The system of claim 1 further comprising a tire mounted on the rim; and
    wherein the spindle, rim, tire, brake rotor and brake caliper are rotatable as a unit about a second axis which is offset from the first axis whereby the unit is adapted to be rotatably mounted on the frame of the vehicle about the second axis.

4. A brake system for a vehicle having a frame, the system comprising:
- a spindle including a spindle member having a first axis and an arm which is rigidly connected to and extends radially outwardly from the spindle member;
- at least one wheel bearing mounted on the spindle member;
- an annular hub in which the at least one wheel bearing and a portion of the spindle member are disposed; wherein the hub is rotatable with respect to the spindle member about the first axis via the at least one wheel bearing;
- a rim rigidly mounted on the hub and rotatable therewith about the first axis; the rim having a substantially circular inboard edge;
- a brake rotor which is rotatable with respect to the spindle member about the first axis;
- a brake caliper for selectively brakingly engaging the brake rotor; wherein the brake caliper is rigidly mounted on the spindle and is disposed at least partially outboard of the inboard edge of the rim;
- wherein the arm is disposed at least partially outboard of the inboard edge of the rim;
- wherein the arm extends radially outwardly from the first axis no further than does the inboard edge of the rim;
- wherein the arm extends radially outwardly from the first axis further than does the hub;
- wherein the arm is adapted to mount on a mounting member which is adapted to mount on the frame of the vehicle;
- wherein the hub has an inboard edge which lies in a substantially vertical inner plane and an outboard edge which lies in a substantially vertical outer plane;
- wherein a substantially vertical central plane is centered between the inner and outer planes and the three planes are substantially parallel to one another; and
- wherein the brake rotor is intersected by the central plane.

5. A brake system for a vehicle having a frame, the system comprising:
- a spindle including a spindle member having a first axis and an arm which is rigidly connected to and extends radially outwardly from the spindle member;
- at least one wheel bearing mounted on the spindle member;
- an annular hub in which the at least one wheel bearing and a portion of the spindle member are disposed; wherein the hub is rotatable with respect to the spindle member about the first axis via the at least one wheel bearing;
- a rim rigidly mounted on the hub and rotatable therewith about the first axis; the rim having a substantially circular inboard edge;
- a brake rotor which is rotatable with respect to the spindle member about the first axis;
- a brake caliper for selectively brakingly engaging the brake rotor; wherein the brake caliper is rigidly mounted on the spindle and is disposed at least partially outboard of the inboard edge of the rim;
- a dampening mechanism adapted to mount on the frame of the vehicle and
- a mounting member adapted to be rotatably mounted on the frame of the vehicle;
- wherein the arm is disposed at least partially outboard of the inboard edge of the rim;
- wherein the arm extends radially outwardly from the first axis no further than does the inboard edge of the rim;
- wherein the arm extends radially outwardly from the first axis further than does the hub;
- wherein the arm is rigidly mounted on the mounting member; and
- wherein the arm extends between the spindle member and the mounting member whereby vertical movement of the spindle is reacted in the dampening mechanism via rotation of the arm and the mounting member.

6. The system of claim 5 wherein the mounting member is rigidly connected to the arm and extends outwardly therefrom in an inboard direction.

7. The system of claim 6 wherein the mounting member is adapted to rotatably connect to an axle of the frame of the vehicle.

8. The system of claim 7 in combination with the axle; and wherein the mounting member is rotatably connected to the axle.

9. The system of claim 6 wherein a portion of the mounting member adjacent its connection to the arm is disposed radially outwardly from the first axis at least as far as is the outer perimeter of the brake rotor.

10. The system of claim 6 wherein the arm has a first end adjacent which the arm is connected to the spindle member; wherein the arm has a second end defining a radially outermost part of the arm; and wherein the mounting member is connected to the arm adjacent the second end.

11. The system of claim 6 wherein the mounting member is disposed entirely radially outwardly of the spindle member.

12. The system of claim 11 wherein the mounting member extends radially outwardly no further than does the inboard edge of the rim.

13. The system of claim 5 wherein the arm has first and second opposed ends; wherein the arm adjacent its first end is connected to the spindle member; and wherein the second end of the arm is disposed adjacent the inboard edge of the rim.

14. The system of claim 5 wherein the spindle, at least one wheel bearing, hub, rim, brake rotor and brake caliper are rotatable as a unit about a second axis which is offset from the first axis whereby the unit is adapted to be rotatably mounted on the frame of the vehicle about the second axis.

15. The system of claim 14 wherein the mounting member is rigidly connected to the arm and extends outwardly therefrom in an inboard direction.

16. The system of claim 15 wherein a portion of the mounting member adjacent its connection to the arm is disposed radially outwardly from the first axis further than is the hub.

17. The system of claim 15 wherein the mounting member is disposed entirely radially outwardly of the spindle member.

18. The system of claim 17 wherein the mounting member extends radially outwardly no further than does the inboard edge of the rim.

19. A brake system for a vehicle having a frame, the system comprising:
- a spindle including a spindle member having a first axis and an arm which is rigidly connected to and extends radially outwardly from the spindle member;
- a rim which is rotatable with respect to the spindle member about the first axis and which has a substantially circular inboard edge;
- a tire mounted on the rim; the tire having a substantially circular inboard edge;
- a brake rotor which is rotatable with respect to the spindle member about the first axis; wherein the brake rotor has a substantially circular outer perimeter;
- a brake caliper for selectively brakingly engaging the brake rotor; wherein the brake caliper is rigidly mounted on the spindle and is disposed at least partially outboard of the inboard edge of the tire;
- a dampening mechanism adapted to mount on the frame of the vehicle; and a mounting member adapted to be rotatably mounted on the frame of the vehicle;

wherein the arm is disposed at least partially outboard of the inboard edge of the tire;

wherein the arm extends radially outwardly from the first axis no further than does the inboard edge of the tire;

wherein the arm extends radially outwardly from the first axis at least as far as does the outer perimeter of the brake rotor;

wherein the arm is rigidly mounted on a mounting member which is adapted to mount on the frame of the vehicle; and wherein the arm extends between the spindle member and the mounting member whereby vertical movement of the spindle is reacted in the dampening mechanism via rotation of the arm and the mounting member.

* * * * *